United States Patent
Gao et al.

(10) Patent No.: US 12,074,931 B2
(45) Date of Patent: Aug. 27, 2024

(54) INTERACTION METHOD AND APPARATUS, AND ELECTRONIC DEVICE

(71) Applicant: BEIJING BYTEDANCE NETWORK TECHNOLOGY CO., LTD., Beijing (CN)

(72) Inventors: Yuze Gao, Shanghai (CN); Jingsheng Yang, Shanghai (CN); Xi Hu, Shanghai (CN); Lingfeng Li, Shanghai (CN); Zhongda Sun, Shanghai (CN); Xin Zhang, Shanghai (CN); Jiaxi Xiahou, Shanghai (CN); Haoran Pang, Shanghai (CN); Ziyun Qi, Shanghai (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/877,341

(22) Filed: Jul. 29, 2022

(65) Prior Publication Data
US 2022/0377119 A1 Nov. 24, 2022

Related U.S. Application Data

(63) Continuation of application No. PCT/CN2021/082699, filed on Mar. 24, 2021.

(30) Foreign Application Priority Data

Mar. 27, 2020 (CN) .......................... 202010234115.2

(51) Int. Cl.
*H04L 65/4053* (2022.01)
(52) U.S. Cl.
CPC ................ *H04L 65/4053* (2013.01)

(58) Field of Classification Search
CPC ...................................................... H04L 65/00
See application file for complete search history.

(56) References Cited

U.S. PATENT DOCUMENTS 11,653,036 B2 * 5/2023 Xue ........................ H04L 65/70
709/219
2005/0283536 A1 12/2005 Swanson et al.
(Continued)

FOREIGN PATENT DOCUMENTS

CN 102238018 A 11/2011
CN 102281460 A 12/2011
(Continued)

OTHER PUBLICATIONS

Notice of Reasons for Refusal issued Nov. 7, 2023 in Japanese Application No. 2022-556485, with English translation (13 pages).
(Continued)

*Primary Examiner* — Zhiren Qin

(57) ABSTRACT

Embodiments of the present invention disclose an interaction method and apparatus, and an electronic device. In a specific embodiment, the method comprises: displaying a stream pushing acknowledgement control; and sending stream pushing acknowledgement information to a server in response to detection of a trigger operation for the stream pushing acknowledgement control, wherein the server sends, in response to reception of the stream pushing acknowledgement information, a live stream generated according to a multimedia conference stream to a target stream pushing address specified by a participant. Hence, a new interaction mode can be provided.

25 Claims, 2 Drawing Sheets

(56) References Cited

U.S. PATENT DOCUMENTS

| | | | |
|---|---|---|---|
| 2015/0103131 A1 | 4/2015 | Denoue et al. | |
| 2016/0359941 A1 | 12/2016 | Kvaal et al. | |
| 2017/0163761 A1* | 6/2017 | Liu | H04L 67/01 |
| 2019/0158889 A1* | 5/2019 | Xue | H04N 21/43 |
| 2019/0222868 A1* | 7/2019 | He | H04N 21/4788 |
| 2019/0238908 A1 | 8/2019 | Lu et al. | |
| 2019/0281327 A1* | 9/2019 | Li | H04N 21/2393 |
| 2019/0320211 A1* | 10/2019 | Chen | H04N 21/2187 |
| 2021/0035559 A1* | 2/2021 | Xu | G10L 15/063 |
| 2022/0150085 A1* | 5/2022 | Tan | H04L 12/1831 |
| 2022/0303605 A1* | 9/2022 | Zhang | H04N 21/6587 |
| 2022/0385989 A1* | 12/2022 | Qiang | H04N 21/2187 |

FOREIGN PATENT DOCUMENTS

| | | |
|---|---|---|
| CN | 102811368 A | 12/2012 |
| CN | 105141971 A | 12/2015 |
| CN | 105872639 A | 8/2016 |
| CN | 107277583 A | 10/2017 |
| CN | 108055496 A | 5/2018 |
| CN | 108289187 A | 7/2018 |
| CN | 109005204 A | 12/2018 |
| CN | 109688480 A | 4/2019 |
| CN | 110839006 A | 2/2020 |
| CN | 112291629 A | 1/2021 |
| JP | 2008022552 A | 1/2008 |
| JP | 2010219887 A | 9/2010 |
| JP | 2015056860 A | 3/2015 |
| JP | 2017135459 A | 8/2017 |
| JP | 2018074474 A | 5/2018 |

OTHER PUBLICATIONS

International Search Report issued Jun. 23, 2021 in International Patent Application No. PCT/CN2021/082699.

Extended European Search Report issued Mar. 30, 2023 in European Application No. 21774480.4 (10 pages).

Decision to Grant a Patent issued Apr. 17, 2024 in Japanese Application No. 2022-556485, with English translation (5 pages).

\* cited by examiner

INTERACTION METHOD AND APPARATUS, AND ELECTRONIC DEVICE

CROSS-REFERENCE TO RELATED APPLICATION

The present application is a continuation application of International Application No. PCT/CN2021/082699, titled "INTERACTION METHOD AND APPARATUS, AND ELECTRONIC DEVICE", filed on Mar. 24, 2021, which claims priority to Chinese Patent Application No. 202010234115.2, titled "INTERACTION METHOD AND APPARATUS, AND ELECTRONIC DEVICE", filed on Mar. 27, 2020, both of which are incorporated herein by reference in their entireties.

FIELD

The present disclosure relates to the field of internet technologies, and in particular to an interaction method, an interaction apparatus, and an electronic device.

BACKGROUND

With the development of the internet, users increasingly rely on functions of terminal devices to bring more convenient to their work and life. For example, a user may start a multimedia conference with other users online through a terminal device. Through the online multimedia conference, long-distance interaction between users can be realized, and users can start a conference without gathering at one place. The multimedia conference eliminates limitations on the location and venue of a traditional face-to-face conference to a great extent.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

An interaction method, an interaction apparatus, and an electronic device are provided according to the embodiments of the present disclosure.

In a first aspect, an interaction method is provided according to an embodiment of the present disclosure, which includes: displaying a push stream confirmation control; and sending push stream confirmation information to a server in response to detection of a triggering operation for the push stream confirmation control, where the server sends a live stream generated based on a stream of a multimedia conference to a target push stream address specified by a participant in response to the push stream confirmation information.

In a second aspect, an interaction apparatus is provided according to an embodiment of the present disclosure, which includes: a first display unit configured to display a push stream confirmation control; and a first sending unit configured to send push stream confirmation information to a server in response to detection of a triggering operation for the push stream confirmation control, where the server sends a live stream generated based on a stream of a multimedia conference to a target push stream address specified by a participant in response to the push stream confirmation information.

In a third aspect, an electronic device is provided according to an embodiment of the present disclosure, which includes: one or more processors; and a storage apparatus storing one or more programs; where the one or more programs, when executed by the one or more processors, cause the one or more processors to perform the interaction method according to the first aspect.

In a fourth aspect, a computer-readable medium storing a computer program is provided according to an embodiment of the present disclosure, the program, when executed by a processor, implementing steps of the interaction method according to the first aspect.

With the interaction method, the interaction apparatus, and the electronic device according to the embodiments of the present disclosure, the push stream confirmation control is displayed; and in response to detection of the triggering operation for the push stream confirmation control, the push stream confirmation information is sent to the server, where the server sends the live stream generated based on the stream of the multimedia conference to the target push stream address specified by the participant in response to the push stream confirmation information, thereby providing a new interaction method.

BRIEF DESCRIPTION OF THE DRAWINGS

The above and other features, advantages and aspects of various embodiments of the present disclosure will become more apparent when taken in conjunction with the accompanying drawings and with reference to the following detailed description. Throughout the drawings, the same or similar reference numbers refer to the same or similar elements. It should be understood that the drawings are schematic and that the components and elements are not necessarily drawn to scale.

DESCRIPTION OF EMBODIMENTS

Figure 1:
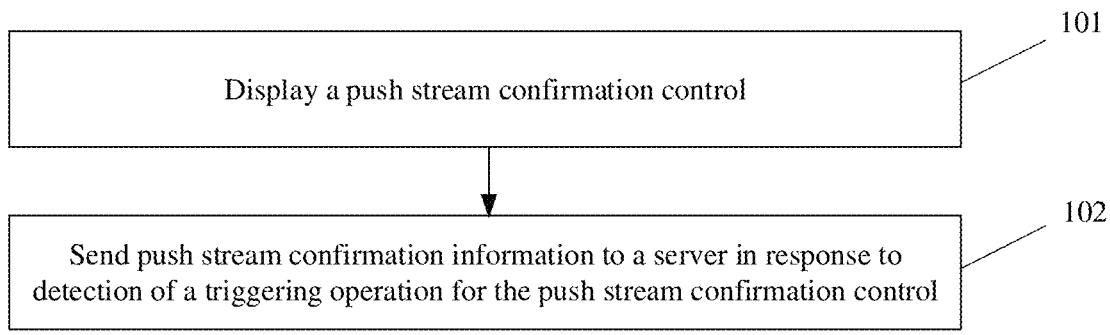
FIG. 1 is a flowchart of an interaction method according to an embodiment of the present disclosure.
Figure 2:
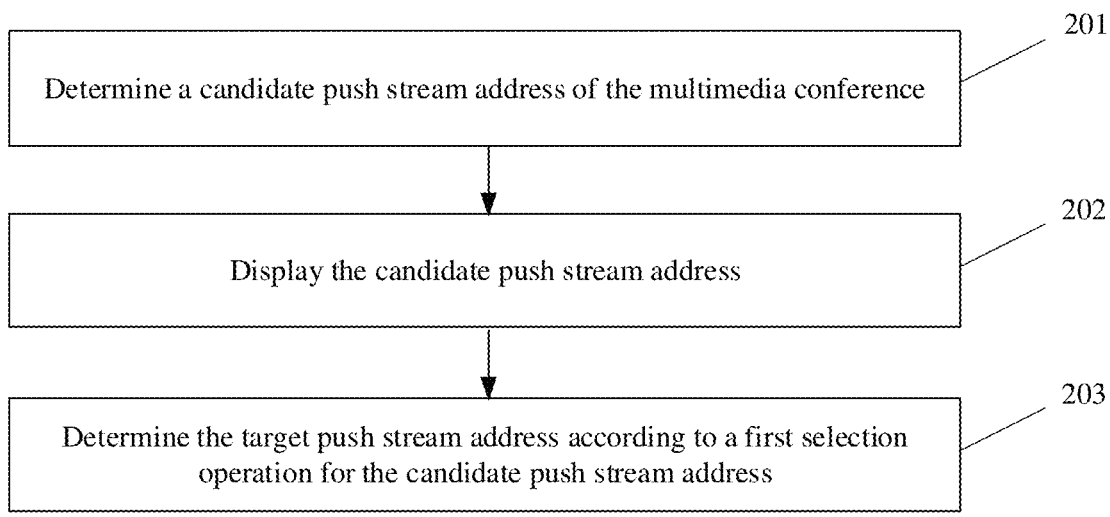
FIG. 2 is a schematic diagrams of a first push stream configuration process according to the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein. Instead, the embodiments are provided for the purpose of a more thorough and complete understanding of the present disclosure. It should be understood that the drawings and embodiments of the present disclosure are only for exemplary purposes, and are not intended to limit the scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are open-ended inclusions, that is, "including but not limited to". The term "based on" means "based at least in part on." The term "one embodiment" means "at least one embodiment"; the term "another embodiment" means "at least one additional embodiment"; the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless the context clearly indicates otherwise, they should be understood as "one or multiple".

The names of messages or information exchanged between multiple devices in the embodiments of the present disclosure are only for illustrative purposes, and are not intended to limit the scope of these messages or information.

Reference is made to FIG. 1, which shows a flow of an interaction method according to an embodiment of the present disclosure. As shown in FIG. 1, the interaction method includes the following steps 101 and 102.

In step 101, a push stream confirmation control is displayed.

In this embodiment, an execution body (for example, a terminal device) of the interaction method may display the push stream confirmation control.

Here, the above push stream confirmation control may be displayed before a multimedia conference or during a multimedia conference.

Here, the multimedia conference may be an online conference conducted in a multimedia manner. The multimedia may include, but is not limited to, at least one of audio and video.

In some embodiments, the multimedia conference may be an instant conference or a scheduled conference. Here, the instant conference may be a conference that is started immediately in response to an initiation. The scheduled conference may be a conference for which an invitation is sent in response to an initiation and that is started at a predetermined time point in the future.

In some application scenarios, the participants in the multimedia conference may include at least two roles. For example, participants may include a host and a participant. The host of the multimedia conference may be an initiator of the conference.

For example, A initiates an online conference reservation and sends an invitation to B and C. In this case, A may be regarded as an initiator of the conference, that is, a host of the conference, and B and C may be regarded as participants of the conference.

In some embodiments, the above push stream confirmation control may be displayed on a client of a user with the permission to start a conference. A user having the permission to confirm the push stream may include, but is not limited to, at least one of the following: the host of the conference and the participant of the conference.

In this embodiment, an application for starting the multimedia conference may be any type of application, which is not limited herein. For example, the above application may be an instant video conferencing application, a communication application, a video playback application, a mail application, and the like.

In this embodiment, the server starts a multimedia conference in response to determination of starting the multimedia conference based on a multimedia conference starting request.

Here, the server may verify the multimedia conference starting request in response to the multimedia conference starting request, and determine to start a multimedia conference based on the multimedia conference starting request in response to determination that a conference starting condition is met.

In some embodiments, the above conference starting condition may be preset. The conference starting condition may include, but is not limited to, at least one of the following: it is time to start the scheduled conference, and a user that sends the multimedia conference starting request is not in a preset blacklist.

Here, starting a multimedia conference may include receiving and forwarding a stream of a multimedia conference of a participant. For example, if A, B, and C are participants, the server may forward streams of the multimedia conference of B and C to A for presentation by A in an interface of the multimedia conference; the server may forward streams of the multimedia conference of A and C to B for presentation by B in an interface of the multimedia conference; and the server may forward streams of the multimedia conference of A and B to C for presentation by C in an interface of the multimedia conference.

In some application scenarios, the user may trigger a live broadcast starting control. Then, the client may display a push stream configuration entry control. After that, the client may display a push stream configuration interface in response to the user triggering the push stream configuration entry control. Here, the user may configure a target push stream address by using the push stream configuration interface. Finally, the client may send the target push stream address configured by the user to the server.

In some application scenarios, after the live broadcast starting control is triggered, the client may display live broadcast access information in addition to the push stream configuration entry.

Here, the server may send the live broadcast access information to a participant. It should be understood that the server may obtain the participant before the conference starts or during the conference. Next, the participant shares the live broadcast access information. In this way, the participant may share the live broadcast access information to a sharing object, and the sharing object may use the live broadcast access information to view the live broadcast of the conference.

It is to be noted that, by the participant sharing the live broadcast access information with the sharing object, the participant may specify an object viewing the conference, such that the dissemination range of the live stream is controlled and the security of content of the multimedia conference is ensured.

Step 102, push stream confirmation information is sent to a server in response to detection of a triggering operation for the push stream confirmation control.

Here, in response to the push stream confirmation information, the server may send a live stream generated based on a stream of a multimedia conference to a target push stream address specified by a participant.

Here, the stream of the multimedia conference may include a set of multimedia conference data. It should be understood that during a multimedia conference, the participant continuously sends multimedia conference data to the server. In this case, the set of data sent by the participant to the server may be vividly referred to as the stream of the multimedia conference.

In some embodiments, the stream of the multimedia conference may include, but is not limited to, at least one of the following: an audio conference stream, and a video conference stream.

In some embodiments, the server may receive the push stream confirmation information before the multimedia conference is started, or during the multimedia conference. If the server receives the push stream confirmation information before the multimedia conference is started, the server has not received the stream of the multimedia conference, and cannot start the multimedia conference. In this case, the server may not immediately start the live broadcast in response to live conference confirmation information, and start the live broadcast when the multimedia conference is started and the stream of the multimedia conference is received.

Here, the stream of the multimedia conference is sent to the server by the participant of the multimedia conference.

Here, the live stream may be generated based on the received stream of the multimedia conference in various ways.

In some embodiments, a received stream of a multimedia conference sent by at least one participant may be combined to form the live stream. For example, the streams of the multimedia conference of three participants A, B, and C may be combined to form the live stream.

It is to be noted that, in the interaction method according to this embodiment, the target push stream address is specified by the participant, and the server sends the live stream generated based on the stream of the multimedia conference to the above target push stream address in response to the push stream confirmation information. In this way:

in a first aspect, compared with the way that the participant sends the live broadcast access information to a candidate viewer, the way that the participant specifies the target push stream address can eliminate the step of the participant sending the live broadcast access information;

in a second aspect, each viewer that accesses through the live broadcast access information needs to request a live stream from the server, and the server needs to connect with the terminal viewer to send the live stream, which causes a burden on the server. In contrast, with the target push stream address method according to this embodiment, the server pushes the live stream to the target push stream address, and the viewer views the live stream at a location (such as a live studio) indicated by the target push stream address, which reduces the calculation and communication burden on the server; and in a third aspect, compared with the way that system personnel specifies a uniform live broadcast web page, the way that the participant specifies the target push stream address allows the participant to determine the push stream address according to the timing of the conference, which improves the pertinence of the push stream and reduces the workload of system personnel.

In some embodiments, the above target push stream address indicates a live broadcast location provided by the push stream platform.

Here, the push stream platform may be configured to provide live broadcast resources and use the live broadcast resources for live broadcast. The push stream platform may divide the live broadcast resources according to the live broadcast location, which may be understood as the live studio. For example, a server side for a live broadcast application may be understood as a push stream platform.

It is to be noted that the live broadcast application may refer to an application with a live broadcast function, and is not limited to an application with only the live broadcast function.

It is to be noted that, as compared with a target push stream address of a webpage type, the target push stream address indicating the live broadcast location (such as the live studio) can utilize the flexibility of the functions of the live studio. For example, the target push stream address may be inserted into a data stream (feed stream), so as to push the above live stream to a wide range of users, thereby widely spreading the above live stream.

In some embodiments, the server of the multimedia conference may send the live stream to the push stream platform, and then the push stream platform may send the live stream to the client of the live broadcast application.

In some embodiments, the multimedia conference client pushes the stream to a media server, the live broadcast server pulls the stream from the media server and forwards the stream to content distribution networks, and the multimedia conference client and the live broadcast client each pulls the stream from a corresponding content distribution network.

In some embodiments, the method further includes: obtaining the target push stream address specified by the participant through a first push stream configuration process; and sending the target push stream address to the server.

Here, the above first push stream configuration process may be executed before triggering a push stream confirmation control. In some embodiments, the above first push stream configuration process may include: a step 201 of determining a candidate push stream address of the multimedia conference; a step 202 of displaying the candidate push stream address; and a step 203 of determining the target push stream address according to a first selection operation for the candidate push stream address.

Here, the above executive body may first determine the candidate push stream address of the multimedia conference, display the candidate push stream address, and then determine the target push stream address according to the first selection operation for the candidate push stream address.

Here, the first selection operation is implemented in various ways. For example, the first selection operation may be an opening operation and/or a closing operation.

It is to be noted that, by first determining the candidate push stream addresses of the multimedia conference, and then allowing the participant to select the target push stream addresses from the candidate push stream addresses, the step of the participant adding the push stream address can be eliminated, thereby avoiding delay of starting of push stream, and improving the timeliness of pushing.

In some embodiments, the determining the candidate push stream address of the multimedia conference includes, but is not limited to, at least one of the following: determining the candidate push stream address according to a historical binding record of at least one of: an identifier of the participant, a conference identifier and a schedule identifier.

Here, the historical binding record may indicate the currently bound push stream address. In other words, through a series of binding and unbinding operations, there may be a final binding result indicating the bound push stream address (including a special case where the number of the push stream address is 0).

Here, the participant may set a personal push stream address that is bound to the participant. In a multimedia conference where the participant is authorized to confirm the push stream, if the participant confirms the push stream, the multimedia conference may push the live stream of the multimedia conference to the personal push stream address of the participant. In other words, the personal push stream address is bound to the participant and may be automatically inherited in respective multimedia conferences of the participant object. In this way, the step of binding the push stream address each time the participant participates in a conference is avoided, which reduces the operations of the participant and improves the push stream efficiency.

Here, the multimedia conference may be subject to multiple rounds of starting and closing (the multimedia conference being started and then being closed due to some factors is regarded as a round of starting and closing). During this process of repeatedly starting and closing, the conference ID does not change. If the conference ID does not change, the conference push stream address directly bound to the conference ID may be displayed as the candidate push stream address when the conference is started again. In this way, steps of binding the push stream address for multiple times during the starting and closing of the conference can be avoided, the operations of the participant are reduced, and the push stream efficiency is improved.

Here, a schedule indicated by the schedule identifier may include a conference indicated by the conference identifier. For example, "a group conference at ten o'clock every Monday morning" may be used as a schedule and has a schedule identifier, and a multimedia conference held every Monday morning belongs to this schedule, but has a different conference identifier. In this way, in the process of starting conferences with similar functions, binding of the push stream address when starting each conference is avoided, which reduces the operations of the participant and improves the push stream efficiency.

In some embodiments, the candidate push stream address is bound for at least one of: an identifier of the participant, a conference identifier and a schedule identifier according to a binding process.

In some application scenarios, when the participant object triggers the push confirmation control, the multimedia conference may not have an inheritable candidate push stream address. In other words, the participant, the conference identifier or the schedule identifier may not be bound to a push stream address. In this case, a prompt message "Please bind a push stream address first" may be displayed to prompt the participant to bind the push stream address.

In some embodiments, the participant may be prompted which one of the identifier of the participant, the conference identifier and the schedule identifier is bound to a newly added push stream address. For example, push stream addresses bound to the identifier of the participant, the conference identifier, and the schedule identifier may be entered respectively in different interfaces or different input areas, so as to prompt the user which of the above is bound to the newly added push stream address.

In some embodiments, which one of the identifier of the participant, the conference identifier, and the schedule identifier is bound to the newly added push stream address may not be prompted to the participant. The server or the terminal may determine which one of the identifier of the participant, the conference identifier, and the schedule identifier is bound to the newly added push stream address according to a classification basis. For example, according to a platform to which the push stream address added by the participant belongs, it can be determined which one of the identifier of the participant, the conference identifier, and the schedule identifier is bound to the newly added push stream address.

In some embodiments, the binding process includes: a binding relationship adding step and/or a first binding relationship releasing step, where the binding relationship adding step is configured to add the candidate push stream address for the multimedia conference, and the first binding relationship releasing step is configured to delete the candidate push stream address of the multimedia conference; and determining the candidate push stream address according to the binding relationship adding step and/or the first binding relationship releasing step.

Here, in the binding process, the binding relationship adding step may not be performed, or the binding relationship adding step may be performed multiple times. Similarly, in the binding process, the first binding relationship releasing step may not be performed, or the first binding relationship releasing step may be performed multiple times.

It should be understood that, through the binding relationship adding step and/or the first binding relationship releasing step, the number and content of the candidate push stream address for the multimedia conference may be changed. After each change, the client may send the latest candidate push stream address to the server.

It is to be noted that, through the binding process, the user may be provided with the opportunity to add or remove the push stream platform, so that the user can set the push stream platform according to the actual situation.

In some embodiments, the binding relationship adding step includes a first adding sub-step including: displaying a first identifier of a first push stream platform; obtaining, in response to detection of a triggering operation for the first identifier, first account information that is on the first push stream platform and that is provided by the participant; and determining the candidate push stream address based on the first identifier and the first account information.

Here, in the first adding sub-step, the first identifier of the first push stream platform may be directly displayed to the participant. Here, the above first push stream platform may be determined according to various methods, which is not limited here.

In some application scenarios, the above first push stream platform may be a default platform capable of performing push stream. Here, the above server may open push stream channels with some push stream platforms in advance, and present these push stream platforms to users. Then, when the user chooses to push the live stream to these push stream platforms, the time for temporarily establishing the push stream channel can be saved and the push stream speed can be improved.

In some application scenarios, the above first push stream platform may alternatively be a push stream platform that is frequently selected by the majority of users. In this way, a push stream platform that may be selected by the participant can be provided, thereby eliminating the step of the user adding the candidate push stream address.

In some application scenarios, the determining the candidate push stream address based on the first identifier and the first account information may include using the first identifier and the first account information as the candidate push stream address.

In some embodiments, the first adding sub-step includes binding the determined candidate push stream address to the identifier of the participant.

In some embodiments, the obtaining the first account information that is on the first push stream platform and that is provided by the participant includes: displaying a control for login, receiving login information by using the control for login, and sending the login information to a server supporting the first push stream platform; and determining, in response to verification pass information for the login information, the first account information that is on the first push stream platform and that is provided by the participant based on the login information.

Here, by the participant logging in, it is verified whether the participant object is authorized to control the first account. In this way, a situation where a push stream address maliciously provided by a user is used can be prevented, and harassment to a push stream address that the participant is not authorized to control can be avoided.

In some application scenarios, the form of the displayed control for login may be set according to the actual situation or according to the selection of the participant, so that different login methods can be realized. For example, the login method may include, but is not limited to, at least one of the following: scan login, account and password login.

In some application scenarios, an authorization confirmation prompt may be displayed after the participant logs in. If the participant performs a confirmation operation on the authorization confirmation prompt, it indicates that the participant allows the above execution subject to obtain public information (such as avatar, nickname, region and gender, and the like) of the participant in s second push stream platform.

In some application scenarios, if the login is successful, a notification of successful binding may be displayed, and the user is prompted that the live stream is pushed to the first account on the first push stream platform after the live broadcast is started.

In some application scenarios, if the login fails, the first account on the first push stream platform cannot be used as the candidate push stream address.

In some embodiments, in some application scenarios, the determining the candidate push stream address based on the first identifier and the first account information may include: determining whether to determine first account on the first push stream platform as the candidate push stream address according to whether the first account is a real-name authentication account.

In some application scenarios, if the first account is not the real-name authentication account, the binding fails (that is, the above first account is not determined as the candidate push stream address), and the user is prompted to perform real-name authentication on the second push stream platform. That is, if there is no real-name authentication account, binding failure prompt information and the real-name authentication prompt information are be displayed.

In some application scenarios, if the first account is the real-name authentication account, the binding successes.

It is to be noted that by determining whether the above first user is a real-name authentication user, the risk that the push stream address is a malicious address can be controlled. If the push stream address is a large amount of malicious addresses, the push stream process consumes a large amount of computational resources and communication resources of the server. In this way, by setting the determination whether the first account is a real-name authentication account, pushing of the live stream of the stream of the multimedia conference to a higher-risk push stream address can be avoided, thereby reducing the consumption of computational resources and communication resources of the server.

In some embodiments, the obtaining the first account information that is on the first push stream platform and that is provided by the participant includes: displaying a control for registration, and registering, according to the control for registration, a first account on the first push stream platform for the participant, and obtaining the first account information that is obtained after registration.

Here, if the participant is not registered on the first push stream platform, the control for registration may be provided for the participant to register. In this way, the speed of adding the first account by the participant can be increased, so as to push the live stream as soon as possible.

In some embodiments, the binding relationship adding step includes a second adding sub-step including: displaying a platform adding control; obtaining, in response to detection of triggering information for the platform adding control, a second identifier of a second push stream platform submitted by a user; displaying, based on the second identifier, an information acquisition control for push stream; obtaining information for push stream by using the information acquisition control for push stream, where the information for push stream includes a push stream indicator; and determining the second identifier and the information for push stream as the candidate push stream address.

In some embodiments, the information for push stream further includes a live broadcast code. It should be understood that the second push stream platform may provide the live broadcast code as push stream auxiliary information for the second push stream platform to perform push stream. Whether the information for push stream includes the live broadcast code is related to push stream settings of the second push stream platform.

In some embodiments, the second adding sub-step includes at least one of the following: binding the determined candidate push stream address to the conference identifier.

In some embodiments, the candidate push stream address determined by implementing the second adding sub-step may be bound to the conference identifier.

In some embodiments, the first binding relationship releasing step includes: determining, in response to a first unbinding operation for the candidate push stream address, the candidate push stream address targeted by the unbinding operation to be an invalid candidate address, and stopping displaying the invalid candidate address.

It is to be noted that, through the first binding relationship releasing step, the participant can be provided with a way to delete the candidate push stream address, and when the user wishes to stop pushing streams to the first push stream platform, streams are not pushed to the first push stream platform, thereby saving computational resources and communication resources.

In some embodiments, a push stream configuration entry for entering a first push stream configuration interface is displayed on at least one of: a user setting interface, a calendar event display interface of the multimedia conference, an interface of the multimedia conference, where the first push stream configuration interface is used for the participant to implement the first push stream configuration process.

Here, the user may perform several common settings through the user setting interface, such as setting a new message reminder, setting a shortcut key, managing a login device, and the like.

It is to be noted that, in the push stream configuration interface entered through the push stream configuration entry in the general interface of the user, the push stream address configured in this interface is bound to the identifier of the participant.

Here, a calendar event of the multimedia conference may be used to remind the user of the starting time of the multimedia conference. The calendar event display interface may display a series of events marked by the user on the calendar. On the calendar event display interface, the above push stream configuration entry may be displayed to remind the user to perform the push stream configuration in advance while reminding the user of the multimedia conference, thereby avoiding missing the live broadcast due to the push stream configuration after the conference is started.

It should be noted that, through the push stream configuration performed through the calendar event display interface, the set push stream address is bound to the conference identifier.

Here, the multimedia conference interface may refer to an interface for displaying a stream of a multimedia conference. The push stream configuration entry may be provided in the multimedia conference interface, indicating that the multimedia conference is started. In a started multimedia conference, push stream configuration may be performed to facilitate the participant to perform push stream configure according to the actual situation of the conference, thereby improving the flexibility of push stream.

In some embodiments, the server determines a changed target push stream address in response to a change triggering condition being satisfied, and sends the live stream to the changed target push stream address.

Here, the change triggering condition indicates a condition of changing the target push stream address.

It is to be noted that, by setting the change triggering condition, the server can change the push stream address in time when a push stream-related situation changes, so as to improve the efficiency and flexibility of push stream.

In some embodiments, the change triggering condition includes at least one of: change of a host, the participant withdrawing from the multimedia conference, and reception of push stream address reset information sent by the participant.

In some embodiments, the method further includes: obtaining the push stream address reset information determined by the participant through a second push stream configuration process; and sending the push stream address reset information to the server.

In some embodiments, the second push stream configuration process includes: updating the target push stream address and generating the push stream address reset information according to a second selection operation for a candidate push stream address.

Here, the participant may enter the push stream configuration interface through the push stream configuration entry, and perform the second selection operation for the candidate push stream address. Through the second selection operation, several candidate push stream addresses may be determined as the target push stream address, and some target push stream addresses may be disabled. In this way, the changed push stream address and the change manner may be sent to the server as the push stream address reset information. Further, the updated target push stream address may be sent to the server as the push stream address reset information.

It is to be noted that, the second push stream configuration process may include only the second selection operation, without granting the permission of the second binding process. The second binding process consumes a greater amount of computational resources and communication resources, and disabling the second binding process during the live broadcast process can prevent the second binding process from occupying live broadcast resources and ensure the smoothness of the live broadcast.

In some embodiments, the second push stream configuration process includes: updating the candidate push stream address according to a second binding process.

In some application scenarios, the second binding process may include at least one of the following: a default platform binding step, a binding platform adding step, and a releasing step.

Here, for the default platform binding step, reference may be made to the above first adding sub-step; for the binding platform adding step, reference may be made to the above second adding sub-step; and for the releasing step, reference may be made to the above first binding relationship releasing step, which are not repeated here.

Here, through the above second push stream configuration process, the participant also add or release a binding relationship during the live broadcast process, thereby improving the flexibility of the push stream process.

In some embodiments, in response to determination that the participant withdraws from the multimedia conference, the server determines the target push stream address bound to an identifier of the participant as a disabled push stream address, and stops sending the live stream to the disabled push stream address.

It is to be noted that, after the participant withdraws from the conference, the push stream address of the participant becomes invalid, the push stream to the invalid push stream address is stopped, which can save push stream resources.

In some application scenarios, the participant may actively withdraw from the multimedia conference, or may withdraw from the multimedia conference passively (for example, due to network failure).

In some application scenarios, in response to determination of the change of the host, the server may determine the target push stream address bound to the host as a disabled push stream address, and stops sending the live stream to the disabled push stream address.

It is to be noted that, after the host is changed, the control authority of the host on the push stream is cancelled, and the push stream needs to be performed according to the push stream address of a new host.

In some application scenarios, push stream to the target push stream address bound to the conference identifier may be continued. The target push stream address bound to the conference identifier may alternatively be disabled, and push stream is performed based on the target push stream address configured by the new host.

Figure 3:
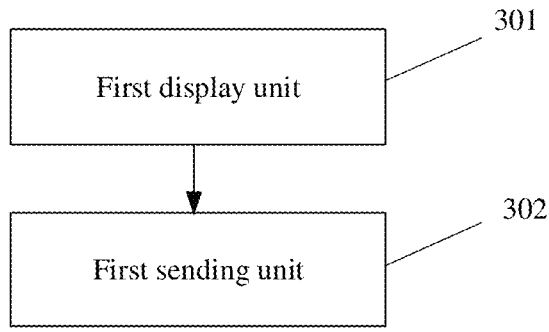
FIG. 3 is a schematic structural diagram of an interaction apparatus according to an embodiment of the present disclosure.

Referring to FIG. 3, as an implementation of the methods shown in the above figures, an interaction apparatus is provided according to an embodiment of the present disclosure, which corresponds to the method embodiment shown in FIG. 1. The apparatus is applicable in various electronic devices.

As shown in FIG. 3, the interaction apparatus according to this embodiment includes a first display unit 301 and a first sending unit 302. The first display unit is configured to display a push stream confirmation control. The first sending unit is configured to send push stream confirmation information to a server in response to detection of a triggering operation for the push stream confirmation control, where the server sends a live stream generated based on a stream of a multimedia conference to a target push stream address specified by a participant in response to the push stream confirmation information.

In this embodiment, for processing of the first display unit 301 and the first sending unit 302 of the interaction apparatus and technical effects thereof, reference may be respectively made to related description of steps 101 and 102 in the corresponding embodiment shown in FIG. 1, which is not described in detail here.

In some embodiments, the target push stream address indicates a live broadcast location provided by a push stream platform.

In some embodiments, the apparatus is further configured to: obtain the target push stream address specified by the participant through a first push stream configuration process; and send the target push stream address to the server.

In some embodiments, the first push stream configuration process includes: determining a candidate push stream address of the multimedia conference; displaying the candidate push stream address; and determining the target push stream address according to a first selection operation for the candidate push stream address.

In some embodiments, the determining the candidate push stream address of the multimedia conference includes: determining the candidate push stream address according to a historical binding record of at least one of: an identifier of the participant, a conference identifier and a schedule identifier, where a schedule indicated by the schedule identifier includes a conference indicated by the conference identifier.

In some embodiments, the determining the candidate push stream address of the multimedia conference includes: binding, according to a binding process, the candidate push stream address for at least one of: an identifier of the participant, a conference identifier and a schedule identifier.

In some embodiments, the binding process includes: a binding relationship adding step and/or a binding relationship releasing step, where the binding relationship adding step is configured to add the candidate push stream address for the multimedia conference, and the binding relationship releasing step is configured to delete the candidate push stream address of the multimedia conference; and determining the candidate push stream address according to the binding relationship adding step and/or the binding relationship releasing step.

In some embodiments, the binding relationship adding step includes a first adding sub-step including: displaying a first identifier of a first push stream platform; obtaining, in response to detection of a triggering operation for the first identifier, first account information that is on the first push stream platform and that is provided by the participant; and determining the candidate push stream address based on the first identifier and the first account information.

In some embodiments, the first adding sub-step includes binding the determined candidate push stream address to the identifier of the participant.

In some embodiments, the obtaining the first account information that is on the first push stream platform and that is provided by the participant includes: displaying a control for login, receiving login information by using the control for login, and sending the login information to a server supporting the first push stream platform; and determining, in response to verification pass information for the login information, the first account information that is on the first push stream platform and that is provided by the participant based on the login information.

In some embodiments, the determining the candidate push stream address based on the first identifier and the first account information includes: determining the first identifier and the first account information as the candidate push stream address in response to determination that a first account indicated by the first account information is a real-name authentication account on the first push stream platform.

In some embodiments, the determining the candidate push stream address based on the first identifier and the first account information includes: displaying binding failure prompt information and real-name authentication prompt information in response to determination that a first account indicated by the first account information is not a real-name authentication account on the first push stream platform.

In some embodiments, the obtaining the first account information that is on the first push stream platform and that is provided by the participant includes: displaying a control for registration, and registering, according to the control for registration, a first account on the first push stream platform for the participant, and obtaining the first account information that is obtained after registration.

In some embodiments, the binding relationship adding step includes a second adding sub-step including: displaying a platform adding control; obtaining, in response to detection of triggering information for the platform adding control, a second identifier of a second push stream platform submitted by a user; displaying, based on the second identifier, an information acquisition control for push stream; obtaining information for push stream by using the information acquisition control for push stream, where the information for push stream includes a push stream indicator; and determining the second identifier and the information for push stream as the candidate push stream address.

In some embodiments, the information for push stream further includes a live broadcast code provided by the second push stream platform.

In some embodiments, the second adding sub-step includes at least one of: binding the determined candidate push stream address to the conference identifier.

In some embodiments, the binding relationship releasing step includes: determining, in response toa first unbinding operation for the candidate push stream address, the candidate push stream address targeted by the unbinding operation to be an invalid candidate address.

In some embodiments, a push stream configuration entry for entering a first push stream configuration interface is displayed on at least one of: a user setting interface, a calendar event display interface of the multimedia conference, an interface of the multimedia conference, where the first push stream configuration interface is used for the participant to implement the first push stream configuration process.

In some embodiments, the server determines a changed target push stream address in response to a change triggering condition being satisfied, and sends the live stream to the changed target push stream address.

In some embodiments, the change triggering condition includes at least one of: change of a host, the participant withdrawing from the multimedia conference, and reception of push stream address reset information sent by the participant.

In some embodiments, the apparatus is further configured to: obtain the push stream address reset information determined by the participant through a second push stream configuration process; and send the push stream address reset information to the server.

In some embodiments, the second push stream configuration process includes: updating the target push stream address and generating the push stream address reset information according to a second selection operation for a candidate push stream address.

In some embodiments, the second push stream configuration process includes: updating the candidate push stream address according to a second binding process.

In some embodiments, in response to determination that the participant withdraws from the multimedia conference, the server determines the target push stream address bound to an identifier of the participant as a disabled push stream address, and stops sending the live stream to the disabled push stream address.

In some embodiments, in response to determination of the change of the host, the server determines the target push stream address bound to the host as a disabled push stream address, and stops sending the live stream to the disabled push stream address.

Figure 4:
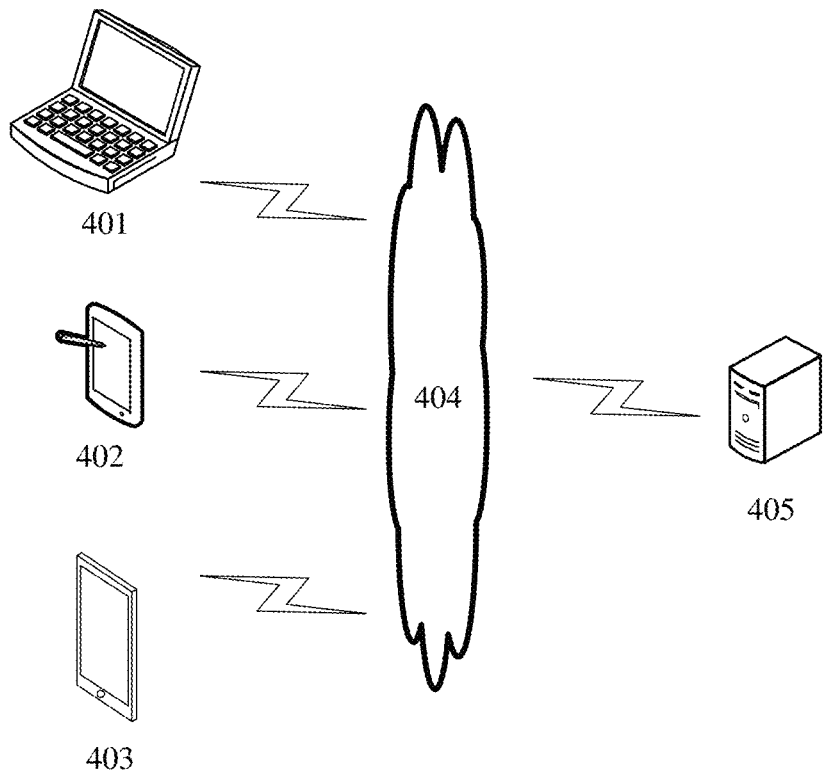
FIG. 4 illustrates an exemplary system architecture in which an interaction method according to an embodiment of the present disclosure is applicable.

Reference is made to FIG. 4, which illustrates an exemplary system architecture in which an interaction method according to an embodiment of the present disclosure is applicable.

As shown in FIG. 4, the system architecture may include terminal devices 401, 402, and 403, a network 404, and a server 405. The network 404 is a medium configured to provide a communication link between the terminal devices 401, 402, 403 and the server 405. The network 404 may include various connection types, such as wired communication links, wireless communication links, or fiber optic cables, and the like.

The terminal devices 401, 402, 403 may interact with the server 405 through the network 404 to receive or send messages and the like. Various client applications may be installed on the terminal devices 401, 402 and 403, such as web browser applications, search applications, and news applications. The client applications in the terminal devices 401, 402, and 403 may receive instructions from users, and perform corresponding functions according to the instructions from the users, such as adding information to another piece of information according to the instructions from the users.

The terminal devices 401, 402, and 403 may be implemented by hardware or software. In a case that the terminal devices 401, 402, and 403 are implemented by hardware, they may be various electronic devices that each has a display screen and supports web browsing, including but not limited to smart phones, tablet computers, e-book readers, MP3 (Moving Picture Experts Group Audio Layer III) players, MP4 (Moving Picture Experts Group Audio Layer IV) players, laptop portable computers, desktop computers, and the like. In a case that the terminal devices 401, 402, and 403 are implemented by software, they may be installed in the electronic devices listed above. The terminal devices 401, 402, and 403 each may be implemented as multiple software or software modules (for example, software or software modules for providing distributed services), or may be implemented as a single software or software module, which is not limited here.

The server 405 may be a server that provides various services, for example, receiving information obtaining requests sent by the terminal devices 401, 402, and 403, obtaining display information corresponding to the information obtaining requests in various ways in response to the information obtaining requests, and sending related data of the display information to the terminal devices 401, 402 and 403.

It is to be noted that the interaction method according to the embodiments of the present disclosure may be executed by a terminal device, and correspondingly, the interaction apparatus may be provided in the terminal devices 401, 402, and 403. In addition, the interaction method according to the embodiments of the present disclosure may alternatively be executed by the server 405, and correspondingly, the interaction apparatus may be provided in the server 405.

It should be understood that the numbers of terminal devices, the network and the server in FIG. 4 are merely illustrative. Any number of terminal devices, networks and servers may be provided according to implementation needs.

Figure 5:
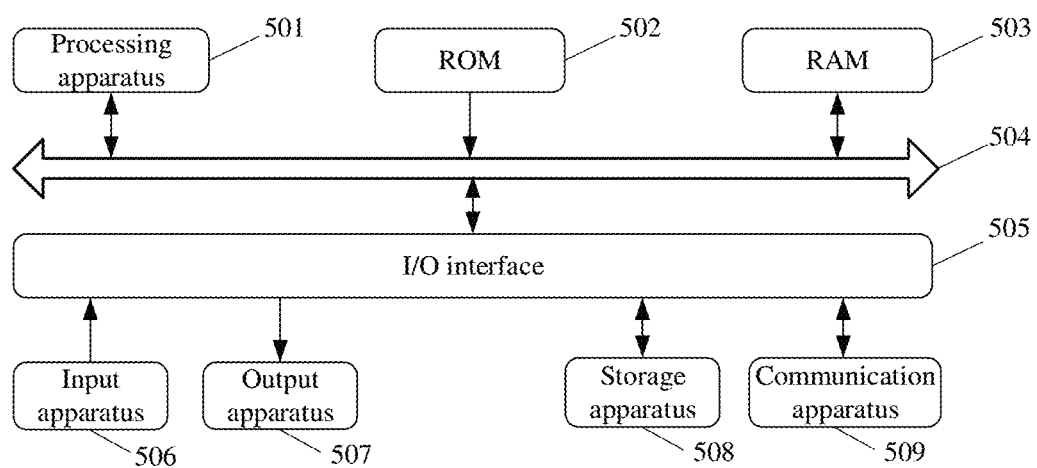
FIG. 5 is a schematic diagram of a basic structure of an electronic device according to an embodiment of the present disclosure.

Reference is made to FIG. 5, which is a schematic structural diagram of an electronic device (for example, the terminal device or the server in FIG. 4) suitable for implementing the embodiments of the present disclosure. The terminal device in the embodiments of the present disclosure may include, but is not limited to, a mobile terminal such as a mobile phone, a notebook computer, a digital broadcast receiver, a PDA (a personal digital assistant), a PAD (a tablet), a PMP (a portable multimedia player), a vehicle-mounted terminal (for example, an in-vehicle navigation terminal), and the like, and a stationary terminal such as a digital TV, a desktop computer, and the like. The electronic device shown in FIG. 5 is only an example, and should not impose any limitation on the function and scope of use of the embodiments of the present disclosure.

As shown in FIG. 5, the electronic device may include a processing apparatus 501, such as a central processing unit or a graphics processor, which can execute various appropriate actions and processes based on a program stored in a Read Only Memory (ROM) 502 or a program loaded from a storage apparatus 508 into a Random Access Memory (RAM) 503. In the RAM 503, various programs and data required by the electronic device 500 for operation are further stored. The processing apparatus 501, the ROM 502, and the RAM 503 are connected to each other through a bus 504. An input/output (I/O) interface 505 is also connected to the bus 504.

Generally, the following may be connected to the I/O interface 505: an input apparatus 506 such as a touch screen, a touch pad, a keyboard, a mouse, a camera, a microphone, an accelerometer, a gyroscope, an output apparatus 507 such as a Liquid Crystal Display (LCD), a speaker, a vibrator, a storage apparatus 508 such as a magnetic tape, a hard disk, and a communication apparatus 509. Based on the communication apparatus 509, the electronic device may communicate with other devices through wired or wireless communication to exchange data. Although FIG. 5 shows the electronic device including various apparatuses, it should be understood that not all shown apparatuses are required to be implemented or included. The shown apparatuses may be replaced by other apparatuses, or more or less apparatuses may be included.

Specifically, the processes described with reference to flow charts, may be implemented as a computer software program according to an embodiment of the present disclosure. For example, a computer program product is provided according to an embodiment of the present disclosure, the computer program product includes a computer program embodied on a non-transitory computer readable medium. The computer program includes program codes for performing the method shown in the flowchart. In such embodiments, the computer program may be downloaded and installed from the network through the communication apparatus 509, installed from the storage apparatus 508, or installed from the ROM 502. The computer program, when being executed by the processing apparatus 501, performs functions defined in the method according to the embodiments of the present disclosure.

It should be noted that the computer readable medium according to the present disclosure may be a computer readable signal medium or a computer readable storage medium or any combination of the two. The computer readable storage medium may include, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a Random Access Memory (RAM), a Read Only Memory (ROM), an Erasable Programmable Read Only Memory (EPROM or a flash memory), an optical fiber, a portable Compact Disk Read-Only Memory (CD-ROM), an optical storage device, a magnetic storage device, or any suitable combination of the foregoing. In the present disclosure, the computer readable storage medium may be any tangible medium containing or storing a program, where the program may be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium may send, transmit or transfer programs used by an instruction execution system, apparatus or device or used in combination therewith. The program codes included in the computer readable medium may be transferred through any proper medium including, but not limited to, an electric wire, an optical cable, RF (Radio Frequency), and the like, or any suitable combination of the foregoing.

In some embodiments, the client and the server may communicate with each other by using any currently known or future network protocol such as HTTP (HyperText Transfer Protocol) to communicate, and may be connected with a digital data network in any form or medium (such as a communication network). Examples of communication networks include a local area network (LAN), a wide area network (WAN), an internet (for example, the Internet), and a peer-to-peer network (such as the ad hoc peer-to-peer network), as well as any current or future networks.

The above mentioned computer-readable medium may be included in the above mentioned electronic device, or may exist alone without being assembled into the electronic device.

The above mentioned computer-readable medium carries one or more programs. The above mentioned one or more programs, when being executed by the electronic device, cause the electronic device to: display a push stream confirmation control; and send push stream confirmation information to a server in response to detection of a triggering operation for the push stream confirmation control, where the server sends a live stream generated based on a stream of a multimedia conference to a target push stream address specified by a participant in response to the push stream confirmation information.

The computer program codes for performing the operations according to the present disclosure may be written in at least one programming language or a combination of the at least one programming language. The programming language includes, but is not limited to, an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowchart and block diagrams in the drawings illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the drawings. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The modules involved in the embodiments of the present disclosure may be implemented in a software manner, or in a hardware manner. The name of the modules does not constitute a limitation of the modules under any circumstances. For example, the first display unit may alternatively referred to as "a unit for displaying a push stream confirmation control".

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, apparatuses, or devices, or any suitable combination of the foregoing. More specific examples of machine-readable storage media include one or more wire-based electrical connections, a portable computer disk, a hard disk, a Random Access Memory (RAM), a Read Only Memory (ROM), an Erasable Programmable Read Only Memory (EPROM or a flash memory), a optical fiber, a Compact Disk Read Only Memory (CD-ROM), an optical storage device, a magnetic storage device, or any suitable combination of the foregoing.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. An interaction method, comprising:
displaying a push stream confirmation control;
displaying a candidate push stream address;
determining the target push stream address according to a first selection operation for the candidate push stream address, wherein the candidate push stream address being determined according to a historical binding record of at least one of: an identifier of a conference participant, a conference identifier, and a schedule identifier, wherein a schedule indicated by the schedule identifier comprises a conference indicated by the conference identifier; and
sending push stream confirmation information to a server in response to detection of a triggering operation for the push stream confirmation control, wherein
the server sends a live stream generated based on a stream of a multimedia conference to a target push stream address specified by a participant in response to the push stream confirmation information.

2. The method according to claim 1, wherein the target push stream address indicates a live broadcast location provided by a push stream platform.

3. The method according to claim 1, further comprising:
obtaining the target push stream address specified by the participant through a first push stream configuration process; and
sending the target push stream address to the server.

4. The method according to claim 3, wherein the first push stream configuration process comprises:
determining a candidate push stream address of the multimedia conference.

5. The method according to claim 4, wherein the determining the candidate push stream address of the multimedia conference comprises:
binding, according to a binding process, the candidate push stream address for at least one of: an identifier of the participant, a conference identifier and a schedule identifier.

6. The method according to claim 5, wherein the binding process comprises:
a binding relationship adding step and/or a binding relationship releasing step, wherein the binding relationship adding step is configured to add the candidate push stream address for the multimedia conference, and the binding relationship releasing step is configured to delete the candidate push stream address of the multimedia conference; and
determining the candidate push stream address according to the binding relationship adding step and/or the binding relationship releasing step.

7. The method according to claim 6, wherein the binding relationship adding step comprises a first adding sub-step comprising:
displaying a first identifier of a first push stream platform;
obtaining, in response to detection of a triggering operation for the first identifier, first account information on the first push stream platform and provided by the participant; and
determining the candidate push stream address based on the first identifier and the first account information.

8. The method according to claim 6, wherein the first adding sub-step comprises binding the determined candidate push stream address to the identifier of the participant.

9. The method according to claim 7, wherein the obtaining the first account information that is on the first push stream platform and that is provided by the participant comprises:
displaying a control for login, receiving login information by using the control for login, and sending the login information to a server supporting the first push stream platform; and
determining, in response to verification pass information for the login information, the first account information on the first push stream platform and provided by the participant based on the login information.

10. The method according to claim 7, wherein the determining the candidate push stream address based on the first identifier and the first account information comprises at least one of:
determining the first identifier and the first account information as the candidate push stream address in response to determination that a first account indicated by the first account information is a real-name authentication account on the first push stream platform; and
displaying binding failure prompt information and real-name authentication prompt information in response to determination that a first account indicated by the first account information is not a real-name authentication account on the first push stream platform.

11. The method according to claim 7, wherein the obtaining the first account information that is on the first push stream platform and that is provided by the participant comprises:
displaying a control for registration, and registering, according to the control for registration, a first account on the first push stream platform for the participant, and obtaining the first account information that is obtained after registration.

12. The method according to claim 6, wherein the binding relationship adding step comprises a second adding sub-step comprising:
displaying a platform adding control;
obtaining, in response to detection of triggering information for the platform adding control, a second identifier of a second push stream platform submitted by a user;
displaying, based on the second identifier, an information acquisition control for push stream;
obtaining information for push stream by using the information acquisition control for push stream, wherein the information for push stream comprises a push stream indicator; and
determining the second identifier and the information for push stream as the candidate push stream address.

13. The method according to claim 12, wherein the information for push stream further comprises a live broadcast code provided by the second push stream platform.

14. The method of claim 12, wherein the second adding sub-step comprises
binding the determined candidate push stream address to the conference identifier.

15. The method according to claim 6, wherein the binding relationship releasing step comprises:
determining, in response to a first unbinding operation for the candidate push stream address, the candidate push stream address targeted by the unbinding operation to be an invalid candidate address.

16. The method according to claim 3, further comprising:
displaying a push stream configuration entry for entering a first push stream configuration interface on at least one of: a user setting interface, a calendar event display interface of the multimedia conference, an interface of the multimedia conference, wherein the first push stream configuration interface is used for the participant to implement the first push stream configuration process.

17. The method according to claim 1, wherein:
the server determines a changed target push stream address in response to a change triggering condition being satisfied, and sends the live stream to the changed target push stream address.

18. The method according to claim 17, wherein the change triggering condition comprises at least one of: change of a host, the participant withdrawing from the multimedia conference, and reception of push stream address reset information sent by the participant.

19. The method according to claim 18, further comprising:
obtaining the push stream address reset information determined by the participant through a second push stream configuration process; and
sending the push stream address reset information to the server.

20. The method according to claim 19, wherein the second push stream configuration process comprises: updating the target push stream address and generating the push stream address reset information according to a second selection operation for a candidate push stream address.

21. Method according to claim 20, wherein the second push stream configuration process comprises:
updating the candidate push stream address according to a second binding process.

22. The method according to claim 18, wherein, in response to determination that the participant withdraws from the multimedia conference, the server determines the target push stream address bound to an identifier of the participant as a disabled push stream address, and stops sending the live stream to the disabled push stream address.

23. The method according to claim 22, wherein, in response to determination of the change of the host, the server determines the target push stream address bound to the host as a disabled push stream address, and stops sending the live stream to the disabled push stream address.

24. An interaction apparatus, comprising:
at least one processor; and
at least one memory communicatively coupled to the at least one processor and storing instructions that upon execution by the at least one processor cause the apparatus to:
display a push stream confirmation control;
display a candidate push stream address;
determine the target push stream address according to a first selection operation for the candidate push stream address, wherein the candidate push stream address being determined according to a historical binding record of at least one of: an identifier of a conference participant, a conference identifier, and a schedule identifier, wherein a schedule indicated by the schedule identifier comprises a conference indicated by the conference identifier; and
send push stream confirmation information to a server in response to detection of a triggering operation for the push stream confirmation control, wherein
the server sends a live stream generated based on a stream of a multimedia conference to a target push stream address specified by a participant in response to the push stream confirmation information.

25. A computer-readable non-transitory medium storing a computer program, the program, when executed by a computer, cause the computer to
display a push stream confirmation control;
display a candidate push stream address;
determine the target push stream address according to a first selection operation for the candidate push stream address, wherein the candidate push stream address being determined according to a historical binding record of at least one of: an identifier of a conference participant, a conference identifier, and a schedule identifier, wherein a schedule indicated by the schedule identifier comprises a conference indicated by the conference identifier; and
send push stream confirmation information to a server in response to detection of a triggering operation for the push stream confirmation control, wherein
the server sends a live stream generated based on a stream of a multimedia conference to a target push stream address specified by a participant in response to the push stream confirmation information.

* * * * *